Nov. 16, 1954 C. E. WILLIAMS 2,694,785

ELECTROLUMINESCENT OSCILLATOR

Filed Sept. 18, 1953 2 Sheets-Sheet 1

Inventor:
Charles E. Williams,
by Kermit C. Kauffman
His Attorney

Nov. 16, 1954 C. E. WILLIAMS 2,694,785

ELECTROLUMINESCENT OCCILLATOR

Filed Sept. 18, 1953 2 Sheets-Sheet 2

Inventor:
Charles E. Williams,
by Vernet C. Kauffman
His Attorney

United States Patent Office 2,694,785

Patented Nov. 16, 1954

2,694,785

ELECTROLUMINESCENT OSCILLATOR

Charles E. Williams, Stanmore, England, assignor to General Electric Company, a corporation of New York Application September 18, 1953, Serial No. 381,040

Claims priority, application Great Britain October 24, 1952

7 Claims. (Cl. 315—58)

This invention relates to arrangements for producing light by means of the phenomenon known as electroluminescence in which luminescent material situated in the space between two electrical conductors is excited to luminescence by the application of a fluctuating voltage between the conductors.

The invention relates more particularly to such arrangements incorporating electroluminescent devices comprising a layer of luminescent material sandwiched between two conducting surfaces and arranged to produce by electroluminescence light which is emitted from the device; such devices will hereinafter be referred to for simplicity as electroluminescent cells. Usually in such cells at least one of the conducting surfaces is partly or wholly transparent or translucent for the emission of light from the device, and the invention relates also to the construction of such cells.

The amount of light emitted by electroluminescent cells depends partly upon the frequency at which the exciting voltage fluctuates. Although the light obtained by utilizing an exciting voltage which alternates at a frequency of 50 cycles per second, such as may be obtained by operating the cell directly from A. C. supply mains, may be sufficient for some purposes, an exciting voltage having a higher frequency than this is often required to produce an adequate emission of light.

The higher frequency may be obtained by means of a thermionic valve oscillator, and the object of this invention is to provide arrangements for producing light by electroluminescence wherein the desired exciting voltage is obtained in a convenient manner by means of such an oscillator. The invention makes use of the fact that in an electroluminescent cell there is an appreciable capacitance between the said two conducting surfaces.

According to the invention an arrangement for producing light comprises an electroluminescent cell in combination with a thermionic valve oscillator adapted to excite the cell, the cell being included in a resonant circuit of the oscillator so that the capacitance of the cell forms part of the capacitance of the said resonant circuit.

In general there is an optimum exciting frequency for an electroluminescent cell at which the light emitted by the cell has a maximum value. By suitable choice of other circuit components, it may readily be arranged that the frequency provided by the oscillator is that at which the cell operates at maximum brightness.

The operating frequency of the oscillator will of course be dependent on the value of the capacitance of the electroluminescent cell and liable to change when one cell is replaced by another; however, cells of similar design will in general have such similar capacitances and characteristics that each will operate substantially at its optimum frequency when included in an oscillator circuit suitably adjusted for the operation of any one of them at its optimum frequency. If necessary, however, control means may be included in the oscillator circuit for adjusting the operating frequency as required for the optimum operation of different cells.

According to another feature of the invention, the electroluminescent cell may be incorporated into a sealed envelope and other components of the thermionic valve oscillator may then be contained within the envelope. In particular, the envelope preferably encloses the thermionic valve or valves of the oscillator. The envelope of the electroluminescent cell may then act also as the envelope of the valve or valves, the electrodes being mounted within the envelope which is then exhausted before sealing according to well-known valve technique. In this case, however, the electroluminescent cell must, of course, be comprised of materials which will not give off gases during the life of the device and so destroy the vacuum. The anode of the valve or valves may in some cases be constituted by the inner conductive coating of the cell, the grid and cathode being supported relatively to the coating within the envelope of the device. The increase of temperature of the electroluminescent cell in operation when the inner conductive coating acts as the anode of the valve, may have the effect, in some cases, of increasing the amount of light emitted by the cell.

Alternatively the oscillator may comprise one or more small valves of the so-called "miniature" type mounted within the envelope of the electroluminescent cell, in which case the envelope need not then be evacuated.

If desired, the whole of the components of the oscillator may be included within, or attached to the outside of, the envelope of the cell and the device arranged to be operated entirely from an A. C. main supply, that is without the need for any additional external supply. The various voltages required for operation of the arrangement are then obtained by means of suitable transformers and rectifiers forming part of the device. Devices of this kind may then be provided with ordinary bayonet caps and be arranged to be used in sockets normally used for other types of lamps, such as incandescent lamps, without any further circuit alterations being necessary.

The rectifiers may consist of diode valves, the valve electrodes being either contained within separate envelopes supported within the envelope of the cell, or, where the latter envelope is arranged to be exhausted, mounted within it in any suitable manner.

In some cases the outer conductive coating may be arranged to operate at earth potential in order to act as an electrostatic screen to reduce or eliminate any audio frequency interference with other electrical equipment.

The invention will now be further explained by describing by way of example, with reference to Figures 1 to 5 of the accompanying schematic drawings, several different embodiments of it.

Figure 1 represents a simple thermionic valve oscillator including an electroluminescent cell in a resonant circuit thereof;

Figure 2 presents a device of the type wherein an electroluminescent cell is enclosed within a glass envelope, the envelope also forming the envelope of a thermionic valve;

Figure 1:
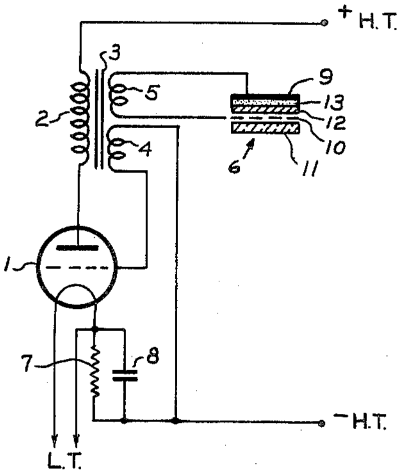

Referring now to Figure 1, a simple thermionic valve oscillator comprises a single directly heated thermionic triode 1. The primary winding 2 of a transformer 3 is included in the anode circuit of the valve, being connected in series with the anode to the positive side of the high tension supply, indicated by H. T.+. One secondary winding 4 of the transformer provides feed-back to the grid of the valve, and another secondary winding 5 is connected in series with an electroluminescent cell 6 to form a resonant circuit therewith. The end of the secondary winding 4 remote from the grid is connected to the negative side of the voltage supply, indicated by H. T.—. A condenser 8, shunting a resistance 7 in the cathode lead of the valve, provides grid bias in operation of the circuit. The valve filament is connected across a low tension supply indicated by L. T. The transformer in the anode load is chosen so that the load impedance has a negligible reactive component. This is necessary for a sufficiently high power output to be obtained from the oscillator for operating the cell efficiently, since the emission of light, besides depending on the frequency of the applied voltage, depends also on its amplitude.

The electroluminescent device 6 comprises two conducting surfaces 9, 10. One surface, 10 in the drawing, is transparent and may conveniently be formed by a thin metal coating on a sheet of glass or other light transmitting material 11. The device comprises also a layer of luminescent material 12 and a thin layer of dielectric material 13, the luminescent and dielectric layers being sandwiched between the surfaces 9 and 10. It will be apparent that other types of oscillator may also be suitable for use in arrangements of this kind, and an amplification stage may be included in the feed-back circuit to the grid of the valve if desired. In an alternative form of cell, the luminescent material may be dispersed throughout the dielectric layer which would then need to be transparent or translucent for the emission of light from the cell.

Figure 2:
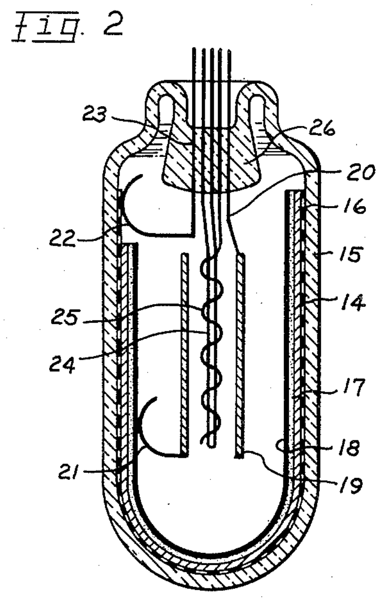

Referring now to Figure 2, there is shown in schematic axial section an electroluminescent device of the type enclosed within a glass envelope. One of the conducting surfaces of the cell is transparent and is shown as a broken line 14. It is formed on the inner wall of a cylindrical glass envelope 15 by contacting the heated glass surface with a vapour of stannic chloride in the presence of moisture. The layer of luminescent material 16 is then applied to the surface of this coating. A thin layer of transparent insulating material 17 covers the layer of luminescent material 16, and this in turn is coated by a second conducting layer 18. The latter layer is preferably light reflecting and may be formed for example by evaporation of a suitable metal such as aluminum.

Within the glass envelope 15 there is mounted a cylindrical metal anode 19 supported by means of a leading-in wire 20 at one end. The anode is connected to the inner conductive coating 18 by means of a metal spring finger 21 attached to its other end and which bears against this coating when the anode is mounted within the envelope. A similar spring finger 22 attached to another leading-in wire 23 bears against the outer transparent conducting coating 14, a part of this coating being left uncovered for this purpose.

Supported centrally within the anode cylinder 19 is a directly heated cathode wire 24 surrounded by a grid 25. The leads to the valve electrodes and to the outer conducting coating 14 pass out through a pinch 26 at the upper end of the cylindrical envelope which is not covered by the layers 14, 16, 17, 18. Supports for the cathode and grid have not been shown for simplicity but may be of any suitable kind, for example as used in normal valve construction.

Figure 3:
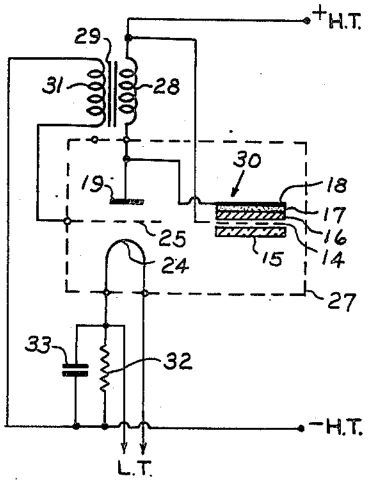
Figure 3 shows a schematic circuit arrangement for operating a device of the kind shown in Figure 2.

Figure 3 shows schematically a circuit arrangement for operating a device of the kind shown in Figure 2, the device being represented within the dotted rectangle 27. The various parts of the device are denoted by the same reference numerals as in Figure 2. In this arrangement, the resonant circuit is formed by the primary winding 28 of a transformer 29, which winding also forms the anode load of the valve contained within the envelope of the device, and the electroluminescent cell 30. Feed-back to the grid 25 of the valve is effected by secondary winding 31. Grid bias is provided by a resistance 32 shunted by a condenser 33 connected in the cathode circuit of the valve as in the circuit arrangement illustrated in Figure 1.

Figure 4:
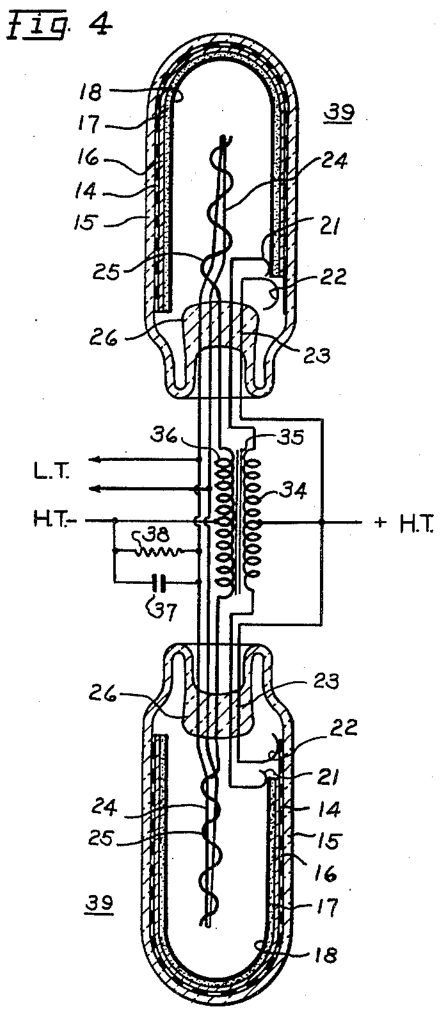
Figure 4 illustrates an arrangement for operating two devices similar to that shown in Figure 2 in push-pull.

Referring now to Figure 4, this arrangement comprises two devices 39, each similar to that described with reference to Figure 2, connected for operation in push-pull. Each of these devices, however, differs from that shown in Figure 2 in that the inner conductive coating 18 is arranged to act as the anode of the valve. The metal cylinder (19 in Figure 2) is dispensed with, and the spring finger 21, which makes contact with the inner conductive coating 18, is attached directly to a leading-in wire. In all other respects the devices are the same as that shown in Figure 2, the corresponding parts of the device being denoted by the same reference numerals as in that figure.

In this arrangement the anodes of the valves, which are constituted by the inner conductive coatings 18 as aforesaid, are connected to the opposite ends of the primary winding 34 of a transformer 35 the center of which winding is connected to the positive lead of the high tension supply, indicated by H. T.+; to this positive lead are also connected the outer conductive coatings 14 of the two devices by means of the spring fingers 22. The grids 25 are connected to opposite ends of a secondary winding 36 of the transformer 35, the center of the secondary winding being connected to the negative lead of the said H. T. supply. The cathode filaments 24 are connected in parallel to a low tension supply indicated by L. T. Grid bias is obtained by means of a condenser 37 shunted across a resistor 38 connecting the negative lead of the H. T. supply to one of the cathode leads.

Figure 5:
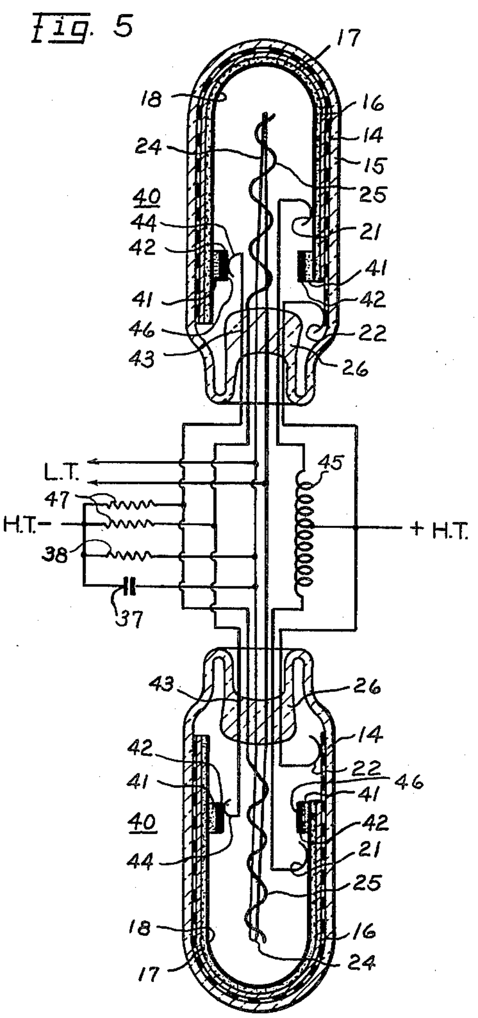
Figure 5 illustrates another push-pull arrangement of two electroluminescent devices similar to those shown in Figure 2 but incorporating additional circuit components.

Figure 5 shows a similar push-pull arrangement for operating two further devices 40 similar to the devices 39 shown in Figure 4, the feed-back to the grids in this case being achieved by means of a resistor-capacitor coupling instead of transformer coupling. The condensers 46 connecting the anode 18 of each of the valves to the grid 25 of the other are formed inside the envelope 15 of the devices. Each condenser 46 comprises a thin annular coating of dielectric material 41 over the inner conducting coating 18 which forms the anode of the valve, the dielectric material being coated in turn with a metal layer 42. The inner conducting coating 18 then forms one plate of the condenser and the metal layer 42 the other, the latter being connected to a leading-in wire 43 passing through the pinch 26 of the envelope 15 by means of a spring finger 44 similar to these fingers 22 and 21 making contact with the outer and inner conductive coatings respectively of the electroluminescent cell.

In this arrangement the anodes 18 are connected together through an inductance 45 the center of which is connected to the positive lead of the H. T. supply, this lead also being connected to the outer conducting coatings 14 of the devices. The grid 25 of each valve is connected to the anode 18 of the other valve through the condenser 46 formed on the anode of the said other valve. Each grid is also connected to the negative lead of the H. T. supply through a grid-leak resistance 47. The cathode filaments are connected in parallel to the low tension supply, one of the leads being connected to the negative lead of the H. T. supply through a resistance 38 shunted by a condenser 37 in order to provide grid bias.

It will be apparent that other modifications may be made to the arrangement without departing from the scope of the invention. For example, a single tubular envelope may contain two sets of valve electrodes, one at each end, in which case the outer conductive coating may be common to both, the inner conductive coating, which acts as the valve anodes, being divided into two separate and mutually insulated sections.

Alternatively, additional electrodes may be included to form a double diode assembly within the envelope of the device, for providing an H. T. supply for operating the oscillator assembly. The rest of the component parts of oscillator may also be included within the single tubular envelope, together with a small transformer for providing the cathode heating current, the device then being arranged to be operated entirely from an A. C. mains supply. In this latter case grid biassing means will also need to be included and the device may be provided at one or both ends with a bayonet or bi-pin cap for connection to the mains supply.

While certain specific oscillator circuits and electroluminescent cell structures embodying the invention have been shown and described, these are intended merely as illustrative examples. It will be appreciated that the invention admits readily of modifications such as have, for instance, been indicated in the specification. The appended claims are therefore intended to cover such modifications coming within the true spirit and scope of the invention.

What I claim as new and desire to secure by Letters Patent of the United States is:

1. A light-producing arrangement comprising an electroluminescent cell including a pair of conductive layers with an electroluminescent phosphor sandwiched therebetween, a thermionic valve oscillator having a resonant circuit connected to its anode, said cell being included in the capacitive portion of said resonant circuit.

2. A light-producing arrangement comprising an electroluminescent cell including a pair of conductive layers with an electroluminescent phosphor sandwiched therebetween, a thermionic valve including an anode circuit and a grid circuit, a resonant circuit comprising said electroluminescent cell and an inductance coupled to said anode circuit, and means for feeding back energy from said anode to said grid circuit.

3. An electroluminescent device comprising a vitreous envelope, a transparent first conductive coating on the inside surface of said envelope, an electroluminescent phosphor coating over said transparent coating, a second conductive coating over said phosphor coating, and a thermionic valve enclosed within said envelope.

4. An electroluminescent device comprising a sealed vitreous envelope, a transparent first conductive coating on the inside surface of said envelope, an electroluminescent phosphor coating over said transparent coating, a second conductive coating over said phosphor coating, said first and second coatings in conjunction with said phosphor forming an electroluminescent cell, thermionic valve elements including a cathode, a control grid, and an anode located in spaced relationship within said envelope, and lead-in wires sealed into said envelope for making connections to said coatings and to said thermionic valve elements.

5. An electroluminescent device comprising a sealed vitreous envelope, a transparent first conductive coating on the inside surface of said envelope, an electroluminescent phosphor coating over said transparent coating, a second conductive coating over said phosphor coating, a cathode and a control grid located in spaced relationship within said envelope, and lead-in wires sealed into said envelope for making connections to said conductive coatings and to said cathode and control grid.

6. In combination, an electroluminescent device comprising a sealed vitreous envelope, a transparent first conductive coating on the inside surface of said envelope, an electroluminescent phosphor coating over said transparent coating, a second conductive coating over said phosphor coating, a cathode and a control grid located in spaced relationship within said envelope, lead-in wires sealed into said envelope for making connections to said conductive coatings and to said cathode and control grid, a voltage supply connected across said cathode and said second conductive coating and forming an anode circuit, an inductance and means connecting said inductance across said first and second conductive coatings to form a resonant circuit, means coupling said resonant circuit to said anode circuit, and means for feeding back energy from said anode circuit to said control grid.

7. In combination, a pair of electroluminescent devices each comprising a sealed vitreous envelope, a transparent first conductive coating on the inside surface of said envelope, an electroluminescent phosphor coating over said transparent coating, a second conductive coating over said phosphor coating, a cathode and a control grid located in spaced relationship within said envelope, lead-in wires sealed into said envelope for making connections to said conductive coatings and to said cathode and control grid, inductive means connecting said second conductive coating in each device to that of the other, a voltage source connected between a point in said inductive means and the cathodes of both said devices and forming anode circuits therefor, means including said first and second conductive coatings in each device in a resonant circuit with said inductive means, means for coupling said resonant circuits into the anode circuits of said devices, and means for feeding back energy from the anode circuit of each device to the control grid of the other.

No references cited.